(12) United States Patent
Xie

(10) Patent No.: US 11,973,925 B2
(45) Date of Patent: Apr. 30, 2024

(54) STEREOSCOPIC DISPLAY SCREEN

(71) Applicant: Yun Xie, Chengdu (CN)

(72) Inventor: Yun Xie, Chengdu (CN)

(73) Assignee: Yun Xie, Chengdu (CN)

( * ) Notice: Subject to any disclaimer, the term of this patent is extended or adjusted under 35 U.S.C. 154(b) by 92 days.

(21) Appl. No.: 17/835,997

(22) Filed: Jun. 9, 2022

(65) Prior Publication Data

US 2022/0321864 A1     Oct. 6, 2022

Related U.S. Application Data

(63) Continuation of application No. PCT/CN2020/135054, filed on Dec. 9, 2020.

(30) Foreign Application Priority Data

Dec. 9, 2019 (CN) .......................... 201911256071.7

(51) Int. Cl.
*H04N 13/312* (2018.01)
*H04N 13/346* (2018.01)
*G06F 3/042* (2006.01)

(52) U.S. Cl.
CPC ......... *H04N 13/312* (2018.05); *H04N 13/346* (2018.05); *G06F 3/042* (2013.01)

(58) Field of Classification Search
CPC .. H04N 13/312; H04N 13/315; H04N 13/346; G06F 3/042
USPC ......................................................... 348/51
See application file for complete search history.

(56) References Cited

U.S. PATENT DOCUMENTS

2002/0020879 A1* 2/2002 Shiiki ................ H01L 27/0802
                                                      257/E27.047
2010/0328438 A1* 12/2010 Ohyama ................ G06F 3/042
                                                      348/51

FOREIGN PATENT DOCUMENTS

| CN | 102478715 A | 5/2012 |
|---|---|---|
| CN | 102654653 A | 9/2012 |
| CN | 104918038 A | 9/2015 |
| CN | 209543887 U | 10/2019 |
| CN | 110750000 A | 2/2020 |
| CN | 210670388 U | 6/2020 |
| JP | 2004144800 A | 5/2004 |

* cited by examiner

*Primary Examiner* — Frantz B Jean
(74) *Attorney, Agent, or Firm* — Nitin Kaushik

(57) ABSTRACT

The present disclosure relates to the field of visual images. A stereoscopic display screen includes: an optical component, configured to provide an optical signal of which the light intensity is lower than the light intensity of video information; a transparent display component, configured to display the video information; and a space imaging frame component, configured to form a hollow enclosed cavity which is visible from the front and has a rear end sealed by the transparent display component. A foreground stage imaging area is formed in an internal region of the space imaging frame component, the space imaging frame component forms, at a position opposite the optical component, a virtual space imaging frame component which takes an axial plane of the transparent display component as a mirror symmetrical plane, and a virtual background stage imaging area is formed in the virtual space imaging frame component.

10 Claims, 2 Drawing Sheets

STEREOSCOPIC DISPLAY SCREEN

CROSS-REFERENCE TO RELATED APPLICATIONS

The application claims priority to Chinese patent application No. 201911256071.7, filed on Dec. 9, 2019, the entire contents of which are incorporated herein by reference.

TECHNICAL FIELD

The present disclosure relates to the field of visual images, in particular to a stereoscopic display screen.

BACKGROUND

Our two eyes are about 60 mm apart in a visual system, so object imaging on the left eye retina and the right eye retina will have some level of horizontal difference when we watch objects, and this phenomenon is commonly known as disparity/parallax. Due to the existence of the disparity/parallax, our brains can judge the distance of the objects, namely, we can see 3D pictures with a feeling of stereoscopic depth.

To display 3D graphics in a computer, that is to say, 3D graphics on a plane, unlike in a real world, where there is a real 3D space and a real distance space. The computer usually needs to establish a sense of space through a 3D coordinate system as a reference, and observes the stereoscopic effect of the object formed due to the characteristic of everything looking small in the distance and big on the contrary in cooperation with human eyes. As shown in the figure below (FIG. 1), by blocking a corresponding coordinate position of different top positions on the surface of the object, information of upper, lower, left and right positions of each top point in the corresponding 3D space is established in the brain, and by blocking the coordinate positions of all top points on the surface of the object, 3D stereoscopic information relative to the coordinate space is formed in the brain finally; and therefore we can judge the distance of the object in the picture, thereby cheating the brain and generating a naked eye 3D effect, as shown in FIG. 1.

Therefore, if it hopes to simulate a holographic 3D effect of an object in reality, it is necessary to build a 3D reference space in a reality space, and meanwhile 3D contents of the object are displayed in the 3D reference space by using a transparent display technology. However, the existing transparent display technology has the defects of high cost, low definition, great volume, etc. For example, the transparent display solution used by the existing holographic projection system includes a common transparent solution for carrying out a secondary imaging by using 45 degrees of holographic glass reflection, but this solution leads to unclear image due to serious light loss and influence of background light after the secondary imaging, and it can be used in a dark environment only. At the same time, a projection source cannot be cancelled. The solution adopting the transparent liquid crystal screen and the backlight or the solution adopting the transparent OLED (Organic Light Emitting Diode) directly has high power consumption and expensive cost because the transparent display requires to be driven by a strong backlight. The common problem of the several solutions is the great system volume, and the definition is not high as a traditional display screen due to the interference from background light.

SUMMARY

The present disclosure provides a stereoscopic display screen, which can solve the technical problems of high cost, low definition and big volume of a holographic 3D effect of an object simulated in reality in the prior art.

The embodiments of the present disclosure are implemented by the following ways:

A stereoscopic display screen includes: an optical component, configured to provide an optical signal of which the light intensity is lower than the light intensity of video information; a transparent display component, configured to display the video information; and a space imaging frame component, configured to form a hollow enclosed cavity which is visible from the front and has a rear end sealed by the transparent display component. A foreground stage imaging area is formed in an internal region of the space imaging frame component, the space imaging frame component forms, at a position opposite the optical component, a virtual space imaging frame component which takes an axial plane of the transparent display component as a mirror symmetrical plane, and a virtual background stage imaging area is formed in the virtual space imaging frame component. The axial plane in the transparent display component refers to a face formed by a semi-transparent and semi-reflective component of the transparent display component and a vertical space imaging frame component in an axial direction. The design solution may effectively reduce the volume of the whole display system, so that the volume is a half of the original volume, and the corresponding hardware consumption is also reduced.

Further, the optical component is embedded into the surface of the space imaging frame component, arranged in the space imaging frame component or outside the space imaging frame, wherein the optical component embedded into the surface of the space imaging frame component includes a light source arranged in the surface of the space imaging frame component and a random light-transmitting structure arranged in the surface of the space imaging frame component, and the light-transmitting structure is the optical component for transmitting the light source to the inner cavity of the imaging frame component from the surface interior of the space imaging frame component. At this time, the optical signal intensity of the optical component projected to the inner cavity of the imaging frame component is lower than that of video information.

Further, the fact that the optical component is arranged outside the imaging frame means that the optical component is formed by a natural light, or the fact that the optical component is arranged outside the imaging frame means that the optical component is arranged outside the space imaging frame component.

Further, the transparent display component includes a display screen and a semi-transparent and semi-reflective component, wherein the semi-transparent and semi-reflective component is arranged between the space imaging frame component and the display screen, and attached to the surface of the display screen.

Further, the semi-transparent and semi-reflective component is a semi-reflective and semi-transparent screen, a semi-penetration and semi-reflective screen, a semi-reflective and semi-penetration screen, a semi-reflective screen, a transparent and reflective screen, a semi-reflective screen, one-way glass or mirror display glass and a semi-transparent and semi-reflective film.

Further, when the display screen displays the video information, three optical signals collect and enter human eyes to form a foreground stage imaging area image, a video content image and a virtual background stage imaging area image. The foreground stage imaging area is closed to the human eyes in relative to the virtual background stage imaging area.

The video information is located between the foreground stage imaging area and the virtual background stage imaging area; and the foreground stage imaging area image, the video content image and the virtual background stage imaging area image form stereoscopic views with a sense of depth of field. Specifically, the three optical signals refer to: 1) the optical signal of the video information penetrates through the mirror glass (semi-transparent and semi-reflective glass) to enter the human eyes, 2) the optical signal emitted from the foreground stage imaging area enters the human eyes, and 3) the virtual background stage imaging area optical signal formed in the foreground stage imaging area through the reflection of the semi-transparent and semi-reflective glass enters the human eyes. Such design solution may abandon the use of the traditional transparent screen. The virtual and transparent effects may also be achieved by using the common liquid crystal screen (non-transparent screen) and the semi-transparent and semi-reflective glass in a stereoscopic space created by the space imaging frame component. The cost of using the traditional transparent screen is greatly reduced, and at the same time, the definition is also greatly improved due to the influence of no background light on the transparent screen.

Further, the video information is 3D video information or 2D video information with a black background.

Further, a sealing component for viewing is arranged at the front end of the space imaging frame component.

Further, a touch screen for controlling the playing of the display content of the display screen is arranged at the front end of the space imaging frame component. Such design solution also solves the problem that the traditional 45 degrees of holographic glass transparent display solution cannot achieve touch control.

Further, the display screen, the touch screen and the optical component arranged inside or on the inner surface of the space imaging frame component are controlled by a processor, and the processor is arranged outside the space imaging frame component.

BRIEF DESCRIPTION OF DRAWINGS

To better clarify the technical solution of the embodiments of present disclosure, the drawings required to illustrate the embodiments of present disclosure will be simply described below. It is understood that the drawings described below merely illustrate some embodiments of present disclosure, so it is not a limitation to the scope. Those ordinarily skilled in the art can obtain other related drawings of other embodiments without creative labor on the basis of those drawings.

DETAILED DESCRIPTION OF THE EMBODIMENTS

The technical solution in the embodiments of the present disclosure will be described below in combination with the drawings in the embodiments of the present disclosure.

Principle of the Present Disclosure:

The virtual and transparent display component is formed by a display screen (non-transparent liquid crystal screen) and a semi-transparent and semi-reflective component (or attach a semi-transparent and semi-reflective film on the display screen) attached to the display screen. Thus, the displayed image content may penetrate through the semi-transparent and semi-reflective component and enter human eyes directly, and at the same time, the foreground stage light in the front of the screen will also enter the eyes directly. The virtual background stage light, formed by the foreground stage light of the screen through the reflection of the semi-transparent and semi-reflective light component, enters into the eyes. The three lights are overlapped, due to different respective optical intensities and lightness, different degrees of transparent effects are achieved finally (for example, the lightness of the pure black part in the video content is 0, at this time, the light entering the eyes is mainly the foreground stage reflective light, the foreground stage light and the reflective light have the same color, so this part is completely transparent, and the content of the background stage, formed by the foreground stage through mirror reflection, is displayed).

Figure 1:
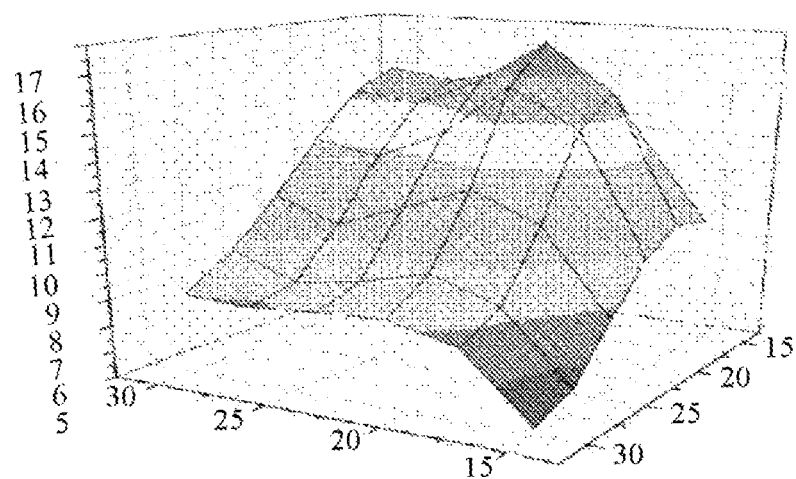
FIG. 1 is a 3D display schematic diagram provided in the present disclosure.
Figure 2:
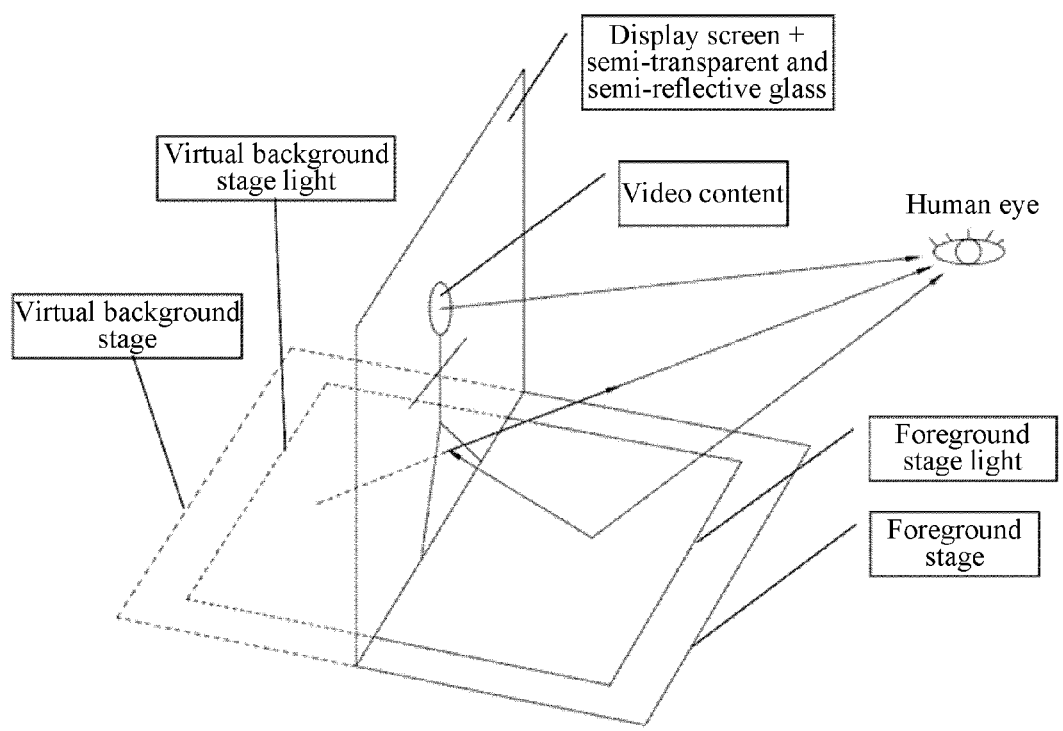
FIG. 2 is a structural schematic diagram of one embodiment provided in the present disclosure.

In the present disclosure, as shown in FIG. 2, a transparent display component is formed by the display screen and the semi-transparent and semi-reflective glass, the transparent display component is vertical to the ground, a rectangular plane foreground stage is arranged in the front of the transparent display component, and a rectangular stage optical component is arranged on the foreground stage. When the display screen displays the video information content, the three lights collect and enter human eyes to form an image, the optical signal of the video information penetrates through the semi-transparent and semi-reflective light component and enters the human eyes directly, the optical signal emitted from the foreground stage imaging area enters the human eyes directly, and the virtual background stage imaging area optical signal formed through the reflection of the semi-transparent and semi-reflective light component in the foreground stage imaging area also enters the human eyes. After entering the human eyes, the three optical signals form the foreground stage imaging area image, the video content image and the virtual background stage imaging area image, the foreground stage imaging area is close to the human eyes in relative to the virtual background stage imaging area, the video information is located between the foreground stage imaging area and the virtual background stage imaging area, and the foreground stage imaging area image, the video content image and the virtual background stage imaging area image form stereoscopic views with a sense of depth of field.

A stereoscopic display screen includes: an optical component, configured to provide an optical signal of which the light intensity is lower than the light intensity of video information; a transparent display component, configured to display the video information; and a space imaging frame component, configured to form a hollow enclosed cavity which is visible from the front and has a rear end sealed by the transparent display component. A foreground stage imaging area is formed in an internal region of the space imaging frame component. Since the semi-transparent and semi-reflective glass arranged on the transparent display component has a mirror effect, the space imaging frame component forms, at a position opposite the optical component, a virtual space imaging frame component which takes an axial plane of the transparent display component as a mirror symmetrical plane, and a virtual background stage imaging area is formed in the virtual space imaging frame component. The axial plane in the transparent display component refers to a face formed by a semi-transparent and semi-reflective component of the transparent display component and a vertical space imaging frame component in an axial direction.

The axial direction of the space imaging frame component refers to a direction vertical to a surface of display video information of the display screen.

Wherein the video information with the black background is transparent in the transparent display component. Pseudo-3D holographic representation of the video information on a stereoscopic stage may be achieved.

Wherein the internal region of the space imaging frame component is a hollow structure.

Wherein the optical signal of the optical component is blue light.

Wherein the optical component is embedded into the surface of the space imaging frame component, arranged in the space imaging frame component or arranged outside the imaging frame.

Specific embodiment 1: the optical component is embedded into the surface of the space imaging frame component, arranged in the space imaging frame component or outside the space imaging frame, including, a light source arranged in the surface of the space imaging frame component and a random light-transmitting structure arranged in the surface of the space imaging frame component, and the light-transmitting structure is the optical component for transmitting the light source to the inner cavity of the imaging frame component from the surface interior of the space imaging frame component.

For example, the random light-transmitting structure arranged on the inner surface of the space imaging frame component may be a latticed line, or foreground stage light as shown in FIG. 2.

Specific embodiment 2: the fact that the optical component is embedded into the space imaging frame component and arranged in the space imaging frame component means that the optical component is arranged in the hollow structure, and the optical information intensity of the video information displayed by the formed display screen is higher than that of the optical component. Specifically, the optical component embedded into the surface of the space imaging frame component includes a light source arranged in the surface of the space imaging frame component and a random light-transmitting structure arranged in the surface of the space imaging frame component, and the light-transmitting structure is the optical component for transmitting the light source to the inner cavity of the imaging frame component from the surface interior of the space imaging frame component.

Specific embodiment 3: the optical component is arranged outside the imaging frame, and the fact that the optical component is arranged outside the imaging frame means that the optical component is formed by natural light.

The special optical component is not required during the day, the natural light can form the equal function as the optical component, so that the optical information intensity of the video information displayed by the display screen is higher than that of the optical component.

Specific embodiment 4: the optical component is arranged outside the imaging frame, and the fact that the optical component is arranged outside the imaging frame means that the optical component is arranged outside the space imaging frame component.

At night, the optical component can be arranged outside the front port of the space imaging frame component, so the optical information intensity of the video information displayed by the formed display screen is higher than that of the optical component.

Specific embodiment 5: the transparent display component includes a display screen and a semi-transparent and semi-reflective component, wherein the semi-transparent and semi-reflective component is arranged between the space imaging frame component and the display screen, and attached to the surface of the display screen.

Specific embodiment 7: the semi-transparent and semi-reflective component is a semi-reflective and semi-transparent screen, a semi-penetration and semi-reflective screen, a semi-reflective and semi-penetration screen, a semi-reflective screen, a transparent and reflective screen, a semi-reflective screen, one-way glass or mirror display glass and a semi-transparent and semi-reflective film.

Specific embodiment 8: the video information is 3D video information or 2D video information with a black background.

Specific embodiment 9: a sealing component for viewing is arranged at the front end of the space imaging frame component. The sealing component may be transparent glass, transparent plastics, etc.

Specific embodiment 10: a touch screen for controlling the playing of the display content of the display screen is arranged at the front end of the space imaging frame component, and the touch screen may seal the front end of the space imaging component.

Specific embodiment 11: the display screen, the touch screen and the optical component arranged inside or on the inner surface of the space imaging frame component are controlled by a processor, and the processor is arranged outside the space imaging frame component.

Specific embodiment 12: the display screen is an insert screen type, that is, a commercial product is used, such as, mobile phone, PAD, display, TV and screen that can be inserted directly to replace the display screen in the present disclosure, thereby reducing the input of the content display part.

Functional modules in each embodiment of the present disclosure may be integrated into one independent part, or each module may have separate physical existence, or two or more modules may be integrated in one independent part.

The above is only embodiments of the present disclosure and is not intended to limit the scope of protection of the present disclosure. Those skilled in the art may make various modifications and variations. Any modifications, equivalent replacements, improvements and the like made within the spirit and principle of the present disclosure shall fall within the scope of protection of the present disclosure. It is noted that the similar sign and letter show the similar items in the drawing below, therefore, once an item is defined in one drawing, it will not further defined or explained in the attached drawings.

In conclusion, the above is only the specific implementation mode of the present disclosure, but the scope of protection of the present disclosure is not limited to this. Those skilled in the art can easily think of changes or replacements within the scope of the technology disclosed in the present disclosure, which shall be covered by the scope of protection of the present disclosure. Therefore, the scope of protection of the present disclosure should be subject to the scope of protection of the appended claims.

It is noted that, in this text, relational terms "first" "second" and the like are merely used for separating one entity or operation from another entity or operation, rather than not necessarily requiring or implying any actual relation or sequence between the entity and the operation. In addition, terms "include" and "contain" or any other variant are intended to cover nonexclusive inclusions herein, so that a process, method, goods or device including a series of elements not only includes those elements but also includes other elements which are not clearly listed or further includes elements intrinsic to the process, the method, the goods or the device. Under the condition of no more limitations, an element defined by the statement "including a/an . . . " does not exclude existence of the same other elements in a process, method, goods or device including the element.

What is claimed is:

1. A stereoscopic display screen, comprising
an optical component, configured to provide an optical signal of which the light intensity is lower than the light intensity of video information;
a transparent display component, configured to display the video information;
a space imaging frame component, configured to form a hollow enclosed cavity which is visible from the front and has a rear end sealed by the transparent display component; a foreground stage imaging area is formed in an internal region of the space imaging frame component, the space imaging frame component forms, at a position opposite the optical component, a virtual space imaging frame component which takes an axial plane of the transparent display component as a mirror symmetrical plane, and a virtual background stage imaging area is formed in the virtual space imaging frame component; and the axial plane in the transparent display component refers to a face formed by a semi-transparent and semi-reflective component of the transparent display component and a vertical space imaging frame component in an axial direction; and
the foreground stage imaging area and the virtual background stage imaging area form a mirror symmetrical stereoscopic space imaging area for displaying the video information.

2. The display screen according to claim 1, wherein the optical component is embedded into the surface of the space imaging frame component, arranged in the space imaging frame component or outside the space imaging frame, the optical component embedded into the surface of the space imaging frame component includes a light source arranged in the surface of the space imaging frame component and a random light-transmitting structure arranged in the surface of the space imaging frame component, and the light-transmitting structure is the optical component for transmitting the light source to the inner cavity of the imaging frame component from the surface interior of the space imaging frame component.

3. The display screen according to claim 1, wherein the fact that the optical component is arranged outside the imaging frame means that the optical component is formed by a natural light, or the fact that the optical component is arranged outside the imaging frame means that the optical component is arranged outside the space imaging frame component.

4. The display screen according to claim 3, wherein the transparent display component comprises a display screen and a semi-transparent and semi-reflective component, the semi-transparent and semi-reflective component is arranged between the space imaging frame component and the display screen, and attached to the surface of the display screen.

5. The display screen according to claim 1, wherein the semi-transparent and semi-reflective component is a semi-reflective and semi-transparent screen, a semi-penetration and semi-reflective screen, a semi-reflective and semi-penetration screen, a semi-reflective screen, a transparent and reflective screen, a semi-reflective screen, one-way glass or mirror display glass and a semi-transparent and semi-reflective film.

6. The display screen according to claim 5, wherein when the display screen displays the video information, three optical signals collect and enter human eyes to form a foreground stage imaging area image, a video content image and a virtual background stage imaging area image; the foreground stage imaging area is closed to the human eyes in relative to the virtual background stage imaging area, the video information is located between the foreground stage imaging area and the virtual background stage imaging area; and the foreground stage imaging area image, the video content image and the virtual background stage imaging area image form stereoscopic views with a sense of depth of field, specifically, the three optical signals refer to:
1) the optical signal of the video information penetrates through the mirror glass to enter the human eyes;
2) the optical signal emitted from the foreground stage imaging area enters the human eyes, and
3) the virtual background stage imaging area optical signal formed in the foreground stage imaging area through the reflection of the semi-transparent and semi-reflective glass enters the human eyes.

7. The display screen according to claim 1, wherein the video information is 3D video information with a black background or 2D video information with a black background.

8. The display screen according to claim 7, wherein a sealing component for viewing is arranged at the front end of the space imaging frame component.

9. The display screen according to claim 7, wherein a touch screen for controlling the playing of the display content of the display screen is arranged at the front end of the space imaging frame component, and the touch screen seals the front end of the space imaging component.

10. The display screen according to claim 9, wherein, the display screen, the touch screen and the optical component arranged inside or on the inner surface of the space imaging frame component are controlled by a processor, and the processor is arranged outside the space imaging frame component.

* * * * *